(12) United States Patent
Shirkhodaie et al.

(10) Patent No.: US 8,768,041 B2
(45) Date of Patent: Jul. 1, 2014

(54) INTELLIGENT AIRFOIL COMPONENT SURFACE IMAGING INSPECTION

(76) Inventors: Amir Shirkhodaie, Nashville, TN (US); Kong Ma, Carmel, IN (US); Robert Moriarty, Greenwood, IN (US)

( * ) Notice: Subject to any disclaimer, the term of this patent is extended or adjusted under 35 U.S.C. 154(b) by 66 days.

(21) Appl. No.: 13/416,315

(22) Filed: Mar. 9, 2012

(65) Prior Publication Data

US 2012/0281908 A1    Nov. 8, 2012

Related U.S. Application Data

(60) Provisional application No. 61/451,005, filed on Mar. 9, 2011.

(51) Int. Cl.
*G06K 9/00* (2006.01)
(52) U.S. Cl.
USPC .......................................... 382/152; 382/151
(58) Field of Classification Search
USPC ......... 382/141, 149, 151, 159, 181, 224, 228, 382/294
See application file for complete search history.

(56) References Cited

U.S. PATENT DOCUMENTS

| | | | |
|---|---|---|---|
| 4,968,892 A | | 11/1990 | McAtee |
| 5,544,256 A | | 8/1996 | Brecher et al. |
| 6,091,846 A | | 7/2000 | Lin et al. |
| 6,703,633 B2 * | | 3/2004 | Tullis ........................... 250/556 |
| 7,397,550 B2 | | 7/2008 | Hackney et al. |
| 7,555,359 B2 * | | 6/2009 | Badarinarayan et al. ...... 700/175 |
| 7,961,933 B2 * | | 6/2011 | Fujii et al. ..................... 382/145 |
| 2002/0188429 A1 | | 12/2002 | Martis |
| 2004/0057057 A1 | | 3/2004 | Isaacs et al. |
| 2004/0083024 A1 | | 4/2004 | Wang |
| 2005/0201611 A1 | | 9/2005 | Lloyd, Jr. et al. |
| 2005/0220335 A1 | | 10/2005 | Budd |
| 2007/0025611 A1 * | | 2/2007 | Kanda et al. .................. 382/149 |
| 2009/0132080 A1 | | 5/2009 | Glasser |

OTHER PUBLICATIONS

International Search Report and Written Opinion, ISA/US, PCT/US2012/028636, Rolls-Royce Corporation, Aug. 16, 2012.
International Search Report and Written Opinion, ISA/US, PCT/US2012/028462, Rolls-Royce Corporation, Jun. 25, 2012.

* cited by examiner

*Primary Examiner* — Daniel Mariam
(74) *Attorney, Agent, or Firm* — Shumaker & Sieffert, P.A.

(57) ABSTRACT

A method for inspecting surfaces including acquiring a surface image from a surface of a component; providing an image registration for the surface image; inspecting the component in response to the image registration to produce an input data set; creating an output data set in response to the input data set utilizing a fuzzy logic algorithm; and identifying a surface feature in response to the surface image and the output data set where acquiring the surface image further includes generating a radiation media; directing the radiation media at the component; detecting a responding radiation media in response to the directed radiation media and the component; creating the surface image in response to detecting the responding radiation media; and adjusting the generation of the radiation media in response to the surface image and a standard image.

16 Claims, 9 Drawing Sheets

INTELLIGENT AIRFOIL COMPONENT SURFACE IMAGING INSPECTION

CROSS REFERENCE TO RELATED APPLICATIONS

The present application claims the benefit of U.S. Provisional Patent Application 61/451,005, filed Mar. 9, 2011, and is incorporated herein by reference. This application also incorporates by reference, in their entirety, the following concurrently filed applications: INTELLIGENT AIRFOIL COMPONENT GRAIN DEFECT INSPECTION, Ser. No. 13/416,516; INTELLIGENT AIRFOIL COMPONENT SURFACE INSPECTION, Ser. No. 13/416,409; AUTOMATED OBJECT MANIPULATION SYSTEM, Ser. No. 13/416,705; PROTOCOL-BASED INSPECTION SYSTEM, Ser. No. 13/416,610; and ILLUMINATION SYSTEM WITH ILLUMINATION SHIELD, Ser. No. 13/416,770.

TECHNICAL FIELD

The present invention generally relates to inspection and evaluation, and more particularly, but not exclusively, to automated surface inspection and evaluation using fuzzy logic analysis.

BACKGROUND

Present approaches to inspection and evaluation suffer from a variety of drawbacks, limitations, disadvantages and problems including those respecting efficiency, repeatability and others. There is a need for the unique and inventive surface imaging inspection apparatuses, systems and methods disclosed herein.

SUMMARY

One embodiment of the present invention is a unique surface imaging inspection process. Other embodiments include apparatuses, systems, devices, hardware, methods, and combinations for a surface imaging inspection process utilizing fuzzy logic analysis. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
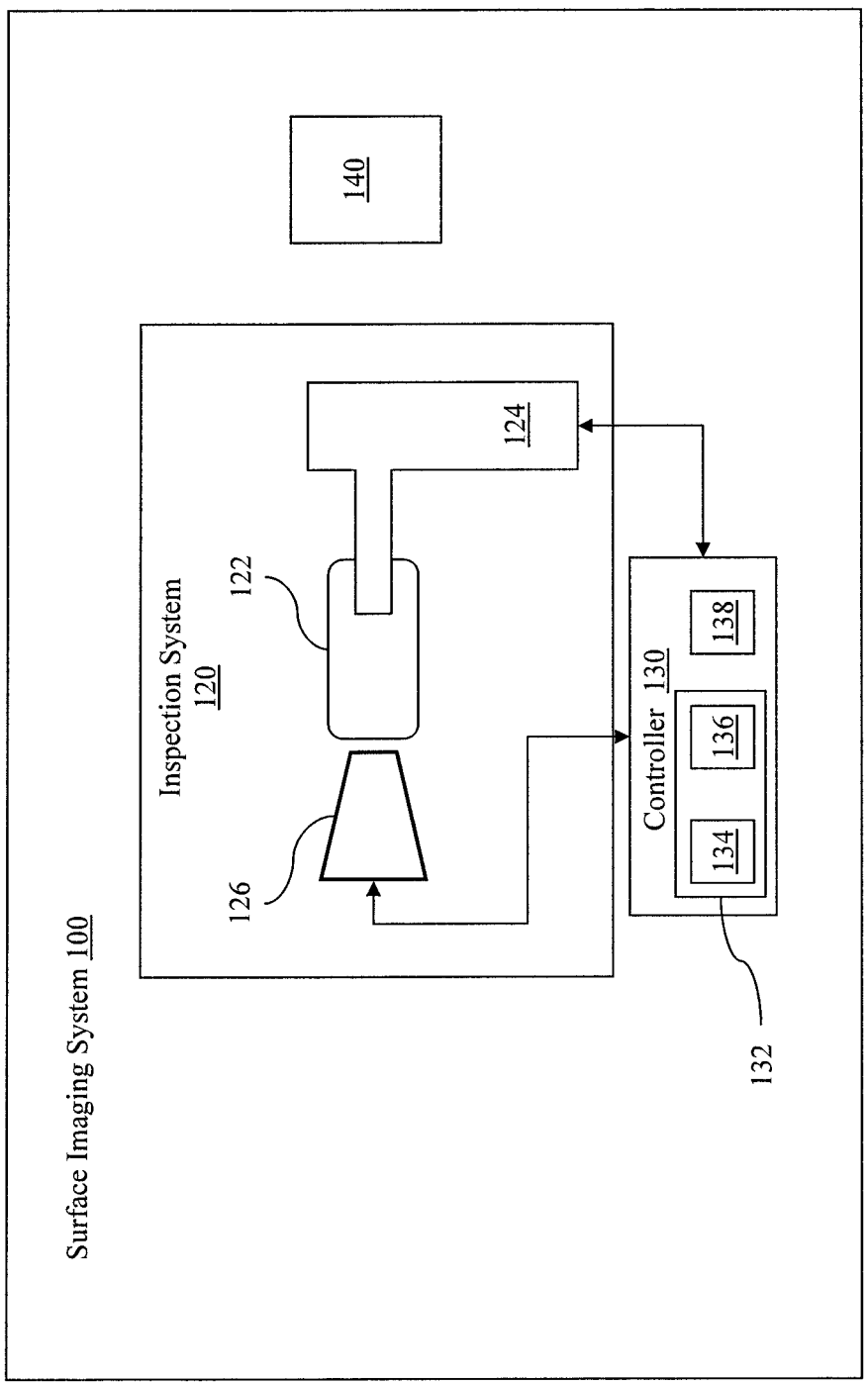
FIG. 1 is an illustration of one embodiment of a surface imaging inspection system.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, an illustration is shown for a surface imaging inspection system 100 representing an embodiment of the present application including an automated imaging process, algorithms, sensors, robotic positioning and other analysis to locate, evaluate and report surface images. Surface imaging inspection system 100 is shown to include an inspection assembly 120 and a controller 130.

Inspection assembly 120, as shown in the embodiment of FIG. 1, includes a positioning system 124 and an imaging system 126. Positioning system 124 of this embodiment operates with a part presentation technique based on an algorithm for manipulating a part 122 in an efficient manner with minimum hunting for part surfaces and anomalies. Embodiments of positioning system 124 can include a robotic part manipulator. Robotic part manipulation can provide consistent positioning of part 122 during the inspection process which can reduce variation and improve efficiency of the inspection process. In some embodiments, part manipulation can include presenting the part to a detection device such as a camera. In one particular embodiment, while positioning system 124 utilizes lighting and image acquisition positions, imaging system 126 acquires images used to identify the type of part 122 being inspected during a registration process. From the registration process, a positioning algorithm is selected to provide predetermined part manipulation during further imaging processes.

Controller 130 of surface imaging inspection system 100 is shown schematically in the exemplary embodiment of FIG. 1 as a single component containing modules capable of performing various functions. Each function can be located on the same or separate pieces of hardware and can be one of several hardware varieties available and arrangable by one skilled in the art. Controller 130 can also include one or more microprocessors where a single microprocessor provides the functions of each module or separate microprocessors are used for one or more of the control modules.

Controller 130 as shown is capable of operating an image data processing system 132 and a robotic manipulation module 138. Robotic manipulation module 138 is shown in FIG. 1 as part of controller 130. Robotic manipulation module 138 can be part of the positioning equipment in positioning system 124 as a single system or as separate components. For one specific embodiment, robotic manipulation module 138 is capable of providing a positioning algorithm, a component type recognition database and a set of predetermined part manipulation instructions to surface imaging inspection system 100.

Image data processing system 132 can include an analyzer module 134 and an imaging module 136. In one embodiment, imaging module 136 can include a controlled electromagnetic radiation configuration with a radiation media generator and a radiation detector whether the detector is physical or digital. The radiation media can include visible light, radio waves, microwaves, infrared radiation, ultraviolet light, x-rays and gamma rays to name a few. The intensity of the emitted radiation media can be adjusted to ensure adequate imaging. The type of radiation media can be selected based on criteria such as but not limited to, equipment availability, component sensitivity, material, estimated defect characteristics and the like.

In one specific embodiment, surface imaging inspection system 100 can utilize a visible light generator with an optical camera for imaging system 126 to produce images of a component as well as produce images of a surface or multiple surfaces of the component. Imaging module 136 is then able to analyze the produced image(s) for surface features. In another embodiment, imaging module 136 can interface with imaging system 126 providing equipment controls as an alternative to controls provided directly with the imaging equipment or from another source.

Surface features indicated by imaging module 136 of surface imaging inspection system 100 can include but are not limited to cracks, porosity, damage, curvature, dimensions and the like. In some embodiments, the component being analyzed can include a single crystal, a directionally solidified, and/or an equiaxed microstructure. In a further embodiment, the component can include an airfoil component of a gas turbine engine. One embodiment operates to mechanically locate, evaluate, and report surface features on families of airfoil type components. Another embodiment of the present system generates a report of the sizes, locations and types of features on the surface of the component in tabular or graphical form.

Using one embodiment from the present application, the process variation for evaluating surface images can be reduced via automating the detection and evaluation of surface features and the application of pass/fail criteria using an analyzer module 134. In one form analyzer module 134 can be a fuzzy logic analyzer module capable of providing analysis of the image data sets from imaging system 126. As will be discussed further herein, fuzzy logic can be used in surface imaging inspection system 100 to deal with fuzzy concepts—concepts that cannot be expressed as "true" or "false" but rather as "partial truths." Fuzzy logic analysis allows an automated inspection to access a deposit of component images 140 or a knowledge bank to apply cognitive characterization of features and provide a level of consistency to determine a pass/fail status according to a component specification.

Another embodiment of the present application applies a lighting configuration, a part presentation technique, and a fuzzy logic based image processing technique for identifying surface features in a single crystal cast airfoil component. Yet another embodiment includes an algorithm for manipulating a part with respect to lighting and camera positions in an efficient manner with minimum hunting for a subject and a fuzzy logic based image processing algorithm to identify surface features which indicate a surface defect.

Figure 2:
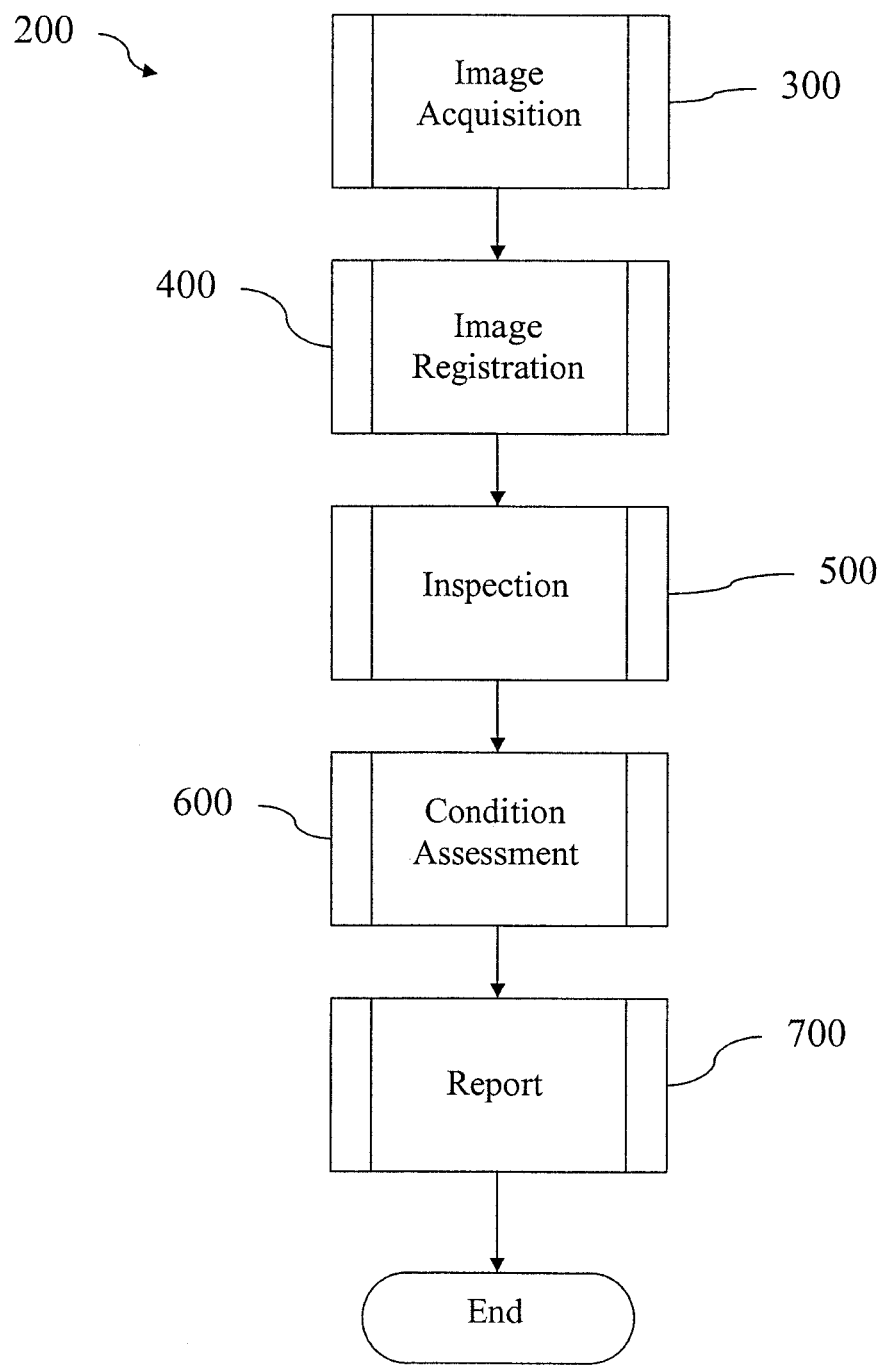
FIG. 2 is a flow diagram of one embodiment of the present application.

One embodiment of the present application is shown in FIG. 2 with a flow diagram of inspection process 200. This embodiment shows inspection process 200 to include five modules: an image acquisition module 300, an image registration module 400, an inspection module 500, a condition assessment module 600 and a reporting module 700. A particular embodiment of the present application can transition between modules and some aspects may or may not be evident in each embodiment.

Figure 3:
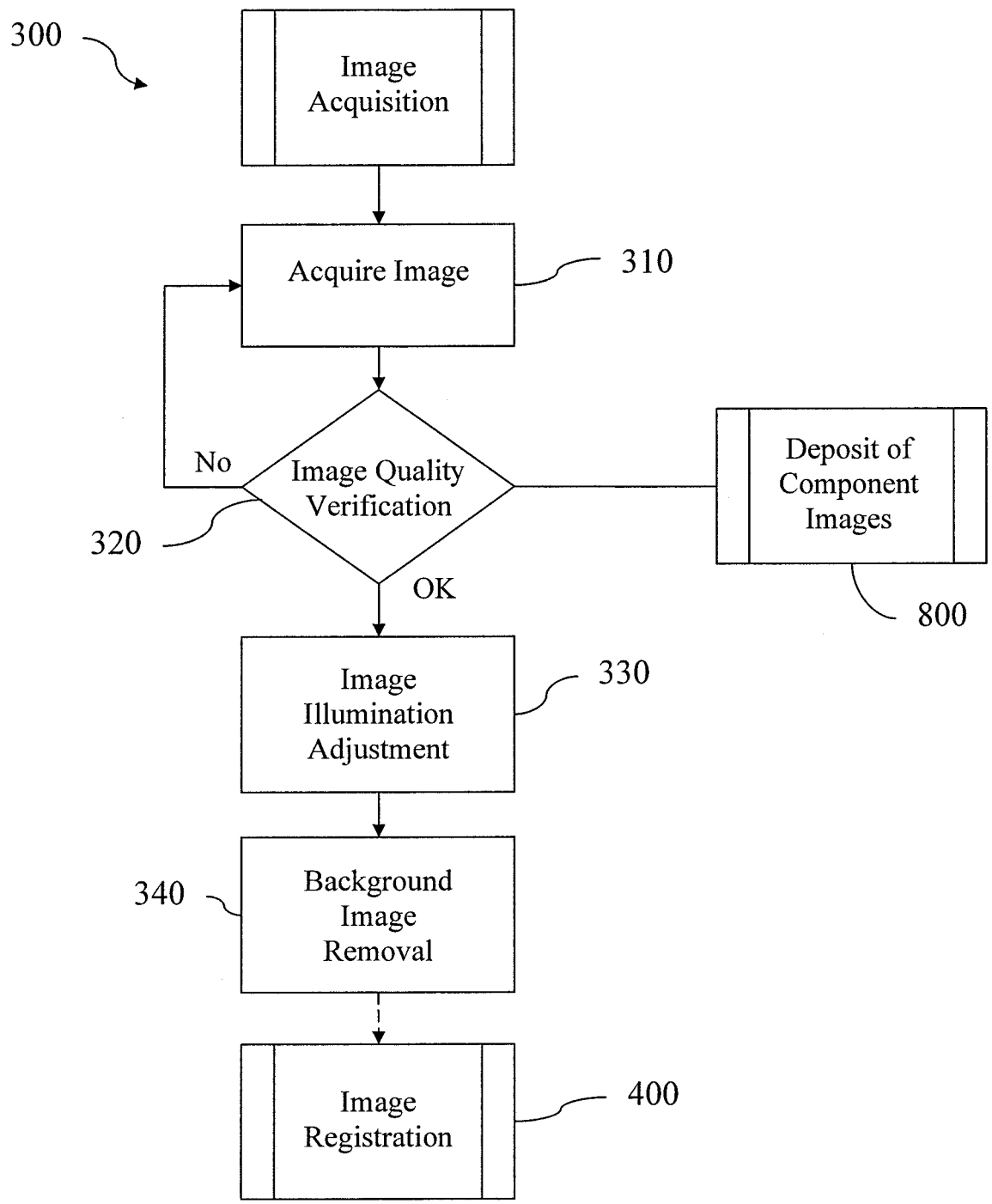
FIG. 3 is a flow diagram of one embodiment of an image acquisition module from FIG. 2.

Inspection process 200 is shown in this embodiment to begin with module 300. Image acquisition module 300 is shown with further detail for one embodiment in FIG. 3. Image acquisition module 300 of this exemplary embodiment begins by acquiring an image in operation 310 with a detection device, camera or electronic image sensor, for example. Various methods are available for acquiring an image such as but not limited to multi-spectral imaging, single shot, multi-shot or scanning image capture. In various embodiments, image acquisition of module 300 can include processing, compression and storage before the data is further processed in image acquisition module 300 or inspection process 200.

Modules which can be a part of the acquisition process to improve the quality of the data created during the acquisition process of module 300 can include image quality verification in conditional 320, image illumination adjustment in operation 330, and background image removal in operation 340. Conditional 320 verifies the image quality. Image quality verification in operation 320 can include a comparison with an image from a deposit of component images 800. If the image quality cannot be verified, image acquisition module 300 returns to operation 310 to acquire another image. Once an image can be verified, image acquisition module 300 moves to operation 330. In operation 330, the illumination can be adjusted to improve contrast, increase illumination or reduce illumination or glare, for example. Operation 330 is shown as preceding operation 340 where a background image (s) can be removed. In one instance, background image removal could provide an image with fewer variations to evaluate or compare.

Figure 4:
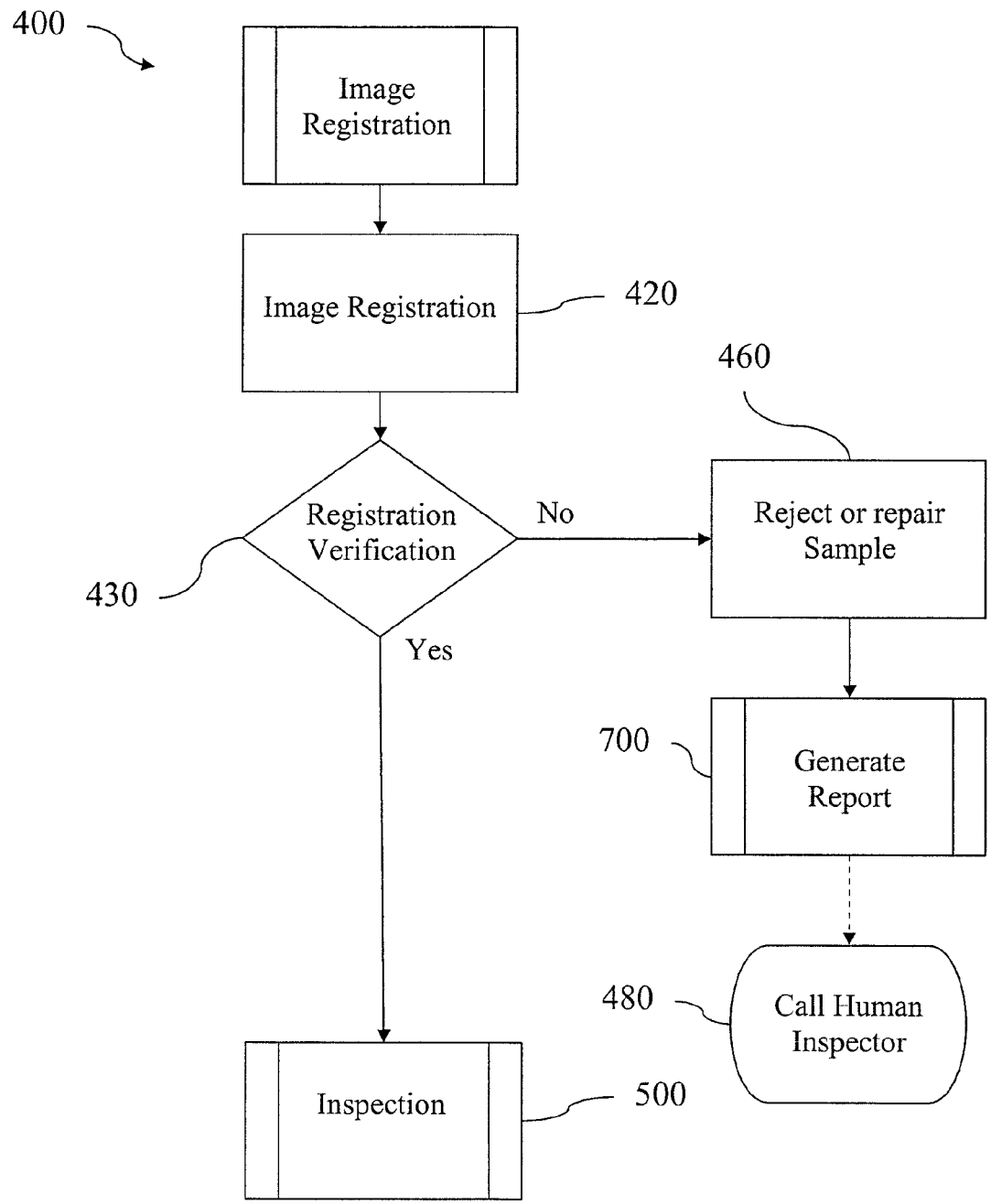
FIG. 4 is a flow diagram of one embodiment of an image registration module from FIG. 2.

Following image acquisition module 300 in inspection process 200 as shown in FIG. 2, image registration module 400 is shown with further detail from one embodiment in FIG. 4 and can begin with operation 420 including image registration. Image registration of operation 420 takes the image from image acquisition module 300 and identifies a set of predetermined features. The part being tested can be identified by component type from the set of predetermined features where further processing routines such as inspection part manipulation can be set up according to the identified component type. The part identification in module 400 can be based on a comparison between a collected image or images of the part being inspected and a database of part responses.

In one embodiment of the present application, once the component type has been identified, the system provides a predetermined manipulation algorithm for part presentation during an imaging process. A part with multiple surfaces suitable for inspection can be automatically rotated and positioned according to a predetermined manipulation algorithm allowing for consistent multiple image acquisitions. For example, a cylindrical component can require rotation along the axis to expose a substantially complete exterior surface. A predetermined manipulation algorithm determined by the system can then include manipulation instructions for positioning the cylindrical component perpendicular to the angle of incidence of the cylinder surface and rotating 360° to maintain the perpendicular orientation.

In another embodiment, image registration module 400 can also contain a macro component quality review with conditional 430 where an image registration can be verified. Conditional 430 determines whether or not the sample image was properly identified by component type. A part without proper features can have an image with missing or non-corresponding form. The missing or non-corresponding form can be an indication of a non-conforming part which requires repair or rejection. In a further embodiment, a part which has been identified to have non-conforming areas in conditional 430 can be evaluated under operation 460 to determine if the part should be rejected or repaired based on a degree of structural non-conformity. A report can be generated in operation 470 and a human inspector can be contacted in operation 480 for confirmation. A part can be labeled as a rejected part in conditional 430 following image registration in operation 420.

In one exemplary embodiment, an airfoil casting with incomplete mold fill would not have an image comparable to a standard image but would show a lack of material with a non-corresponding form. Image registration 420 can determine an airfoil component using an outline image but registration verification 430 can identify a missing portion of the image. The degree of deformity and location of the deformity can be factors in deciding whether the part is rejected or repaired in operation 460. In another non-limiting example, a casting with a uniform surface can have a profile comparable to a standard image in image registration 420. Registration verification 430 can determine if no macro deformities are present when comparing the acquired image with a standard image and verifying the part is ready for inspection.

Figure 5:
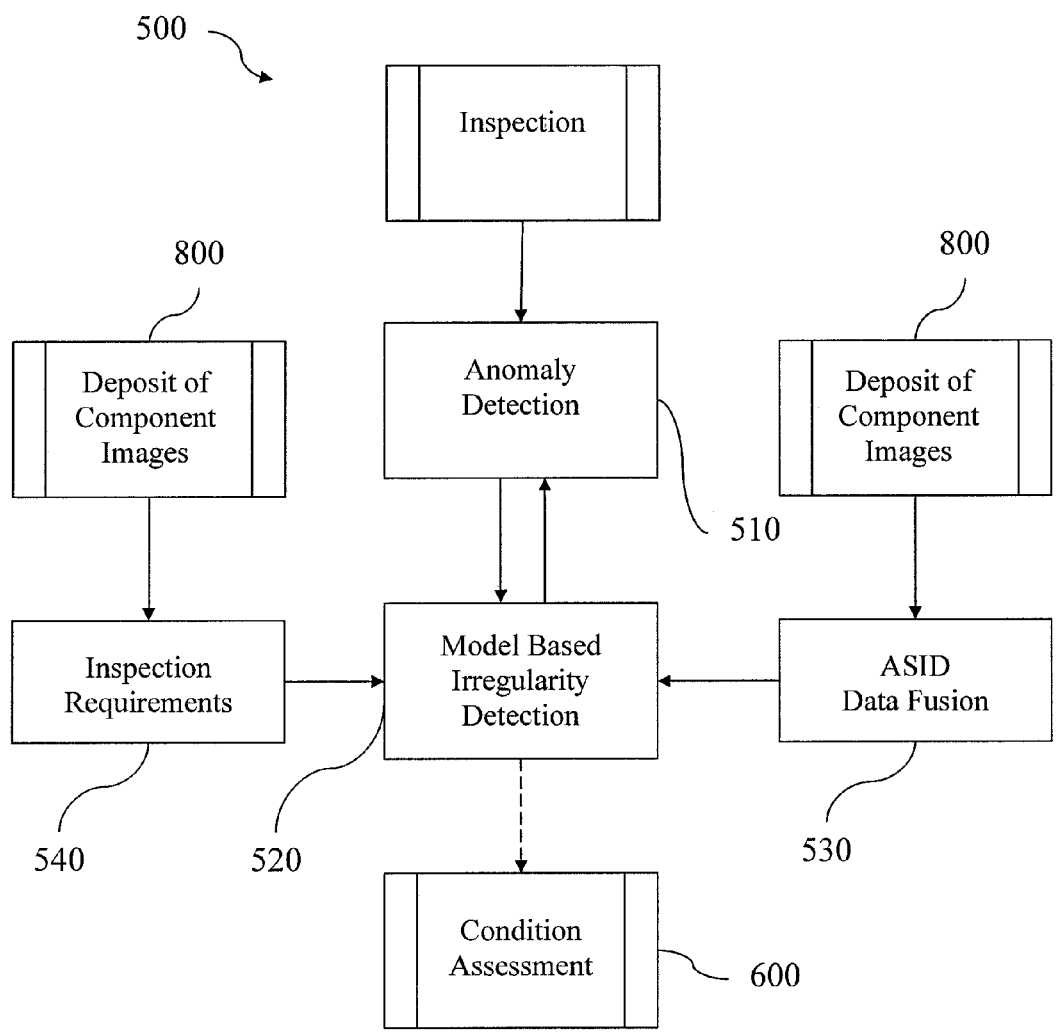
FIG. 5 is a flow diagram of one embodiment of an inspection module from FIG. 2.

Once a part is registered in module 400, inspection process 200 can continue with inspection of the part in inspection module 500. Inspection module 500 is shown with further detail for one embodiment in FIG. 5. For inspection of a part, module 500 can be capable of presenting the part with a predetermined manipulation algorithm based on the automated recognition and registration in module 400. As the part is presented, operation 510 includes anomaly detection. Anomaly detection can include collecting surface images as the part is manipulated to pre-determined positions. Surface images can be generated and captured by processes such as but not limited to reflected light, negative light, luminescence, fluorescence, x-ray and the like. In a specific embodiment, a surface with grooves would reflect radiation media in planes related to the grooves; radiation media detected outside the expected planes can indicate undesirable groove geometries or anomalies.

Collected surface images are evaluated in operation 520 for detecting potential irregularities. In one embodiment, evaluation in operation 520 can include an image data processing module of a controller which analyzes surface images for variations outside a standard with model based irregularity detection. Variations can include low reflective response or excessive reflective response, a low negative light or excessive negative light, no luminescence detected or uncharacteristic diffraction patterns depending on the type of surface image generation applied and the method for capturing the image. In another embodiment, irregularities are determined when collected images are compared with an airfoil surface imperfection detection (ASID) technique data fusion 530 or component inspection requirements 540. Both ASID data fusion 530 and inspection requirements 540 can operate with access to deposit of component images 800. Deposit of component images 800 can provide standard data sets for comparison.

Figure 6:
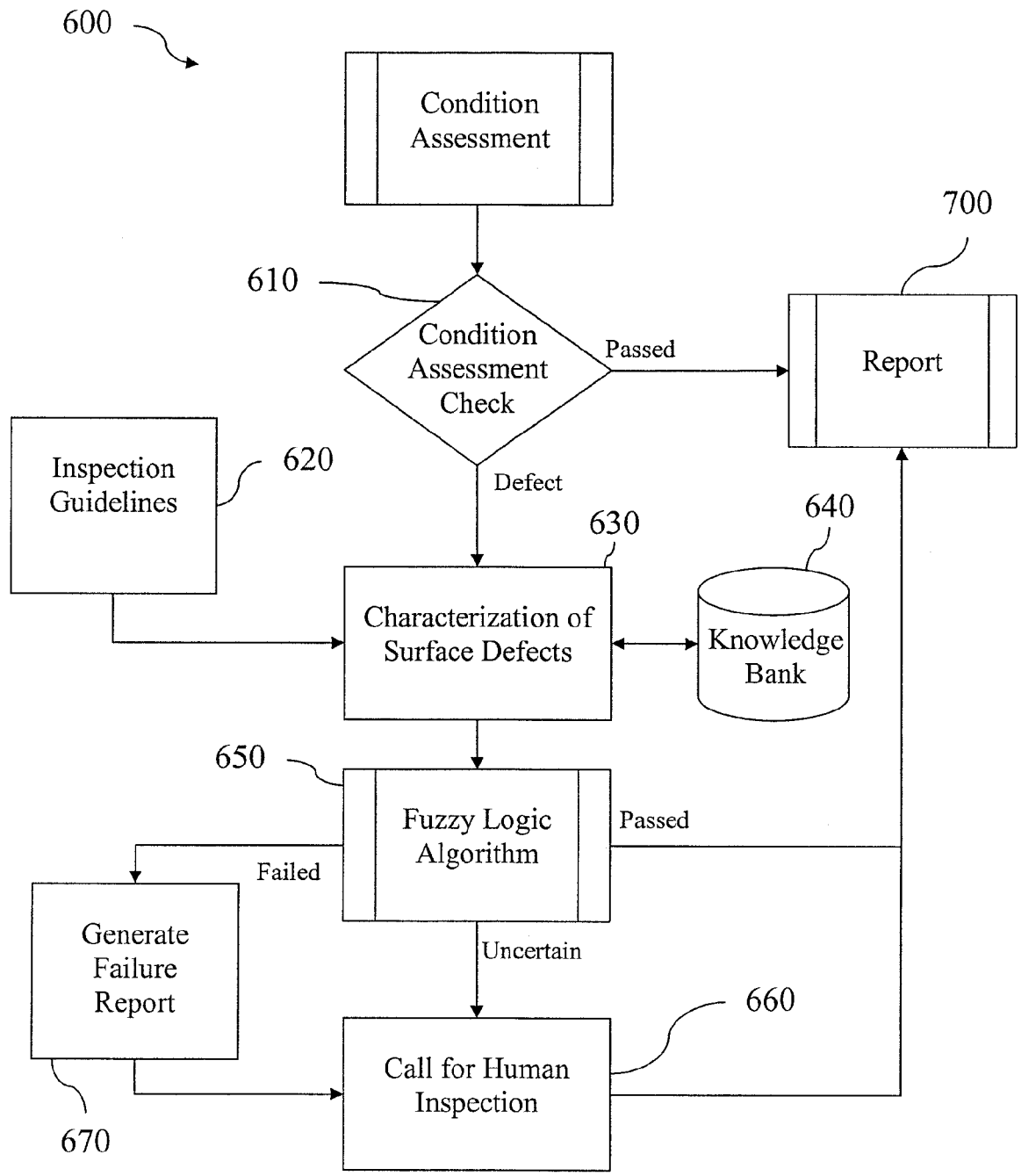
FIG. 6 is a flow diagram of one embodiment of a condition assessment module from FIG. 2.

The image data collected during module 500 can be provided to module 600 which applies a fuzzy logic analysis of the sensed image(s). Condition assessment module 600 is shown with further detail from one embodiment in FIG. 6. Module 600 is shown to begin with conditional 610 where an initial determination of part quality can result in parts with no indications of anomalies moving to a final report in module 700. Parts with identified anomalies move on for further assessment in module 600 including an automated anomaly characterization in operation 630. Operation 630 accesses a knowledge bank 640 to apply cognitive characterization of anomalies or features indicated by the image processing. Operation 630 references inspection guidelines 620. Inspection guidelines 620 can result from design specifications, industry standards, or others. Guidelines can include specific criteria for smoothness, dimensional stability, porosity, density, chemical composition as well as physical characteristics such as cracks, damage, and other defects. With input from operation 630, a fuzzy logic analysis is performed in module 650. Fuzzy logic analysis and cognitive characterization in module 600 provides an objective ability to determine a consistent pass/fail status for parts being inspected.

An automated image processing method in an embodiment of the present application can include fuzzy logic analysis to enable the system to use an analysis tool with appropriate processing times for part inspection. A fuzzy logic analysis system is a logic analysis system operable to process data by replacing what are commonly Boolean logic rules with a collection of fuzzy membership functions and rules. An example rule in a fuzzy logic system can be of the form:

If x is low and y is high, then z is low, where x and y are input variables, z is an output variable, "low" is a membership function defined on x and z, and "high" is a membership function defined on y.

The rule's premise describes the degree to which the rule applies, while the rule's consequent assigns a membership function to the output variable(s), where the set of rules in a fuzzy logic analysis system is known as the rule base or knowledge base. Data processing in a fuzzy logic analysis system of an embodiment of the present application can include four high level steps that correspond roughly to an input stage, a processing stage, a compilation stage and an output stage.

Because fuzzy logic is a mathematical model for addressing inherently imprecise data, a fuzzy logic analysis can be applied to the present application. Fuzzy logic provides a mathematical model of the vagueness found in non-precise measurements allowing automated determinations regarding component analysis such as surface imaging.

Figure 6A:
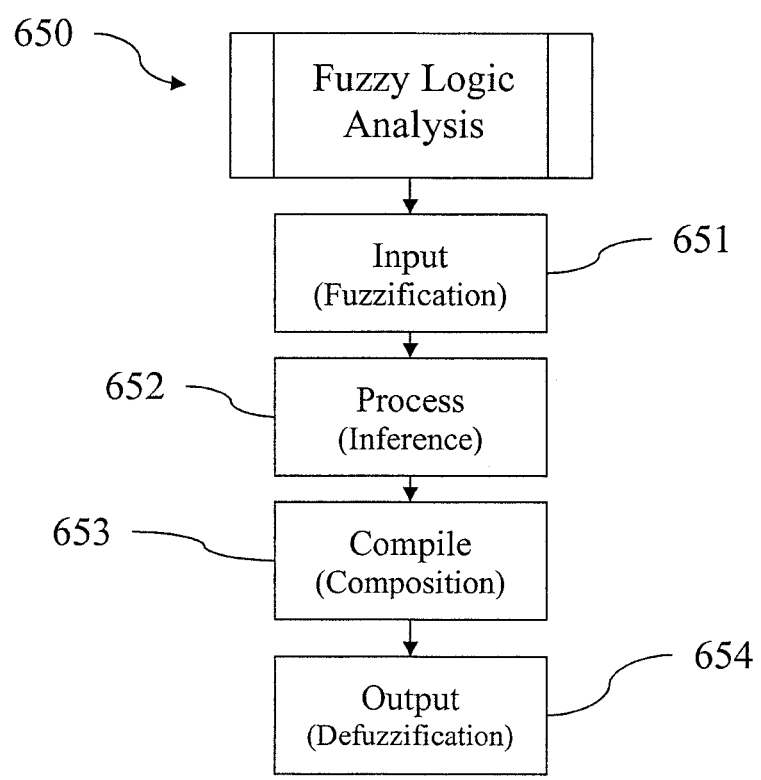
FIG. 6a is a flow diagram of one embodiment of a fuzzy logic analysis module.

FIG. 6a shows four operations that can be part of fuzzy logic algorithm 650 which are input 651, processing 652, compilation 653 and output 654. These operations can be described in slightly differing terms and can be combined, expanded or omitted based on the way the fuzzy logic analysis is described without changing the meaning or intent of using fuzzy logic in this embodiment of the present application.

1. Input Stage 651—Fuzzification: The membership functions defined for the input variables can be applied to the actual values of the input variables to determine the degree of truth for each rule premise. The input variables in a fuzzy control system are in general mapped into sets of membership functions known as "fuzzy sets" in the process of converting an input value to a fuzzy value. All the rules that apply can be invoked, using the membership functions and truth values obtained from the inputs, to determine the results of the rules.
2. Processing stage 652—Inference: The truth value for the premise of each rule can be computed and applied to its consequent. This computation results in one fuzzy subset being assigned to each output variable. The computation result in turn can be mapped into a membership function and truth value controlling the output variable.
3. Compilation stage 653—Composition: All of the fuzzy subsets assigned to each output variable can be combined together to form a single fuzzy output subset for each output variable.
4. Output stage 654—Defuzzification: The fuzzy output subset for each output variable can be convertible to a unique solution or a 'crisp' answer.

In an exemplary embodiment, a component image is acquired and a data set is created. Module 650 compares the image data set to a set of rules assigning a degree of conformity to the data set. The degree of conformity is a representation of the amount of variation between the component image and an image from a deposit of images or set of guidelines. The degree of conformity can be representative of other levels of comparison in other embodiments. Continuing with this embodiment, the degree of conformity is compiled to produce an output data set related to position and level of conformity. The output data set is compared to data sets in the knowledge bank to determine whether the output data sets are consistent with anomalies. Output data sets consistent with anomalies provide an indication of the anomalies present in the component. Automated review of the conformity data set in this exemplary embodiment is capable of reducing variation found in surface indication detection.

Upon completion of fuzzy logic analysis in operation 650, a part can move on to a final report in module 700 following a passing result from operation 650 or a part can move on to a failure report generation in operation 670 following a failing result from operation 650. Additionally, a part labeled as rejected can be provided for human inspection in cases where operation 650 provides an uncertain result.

Figure 7:
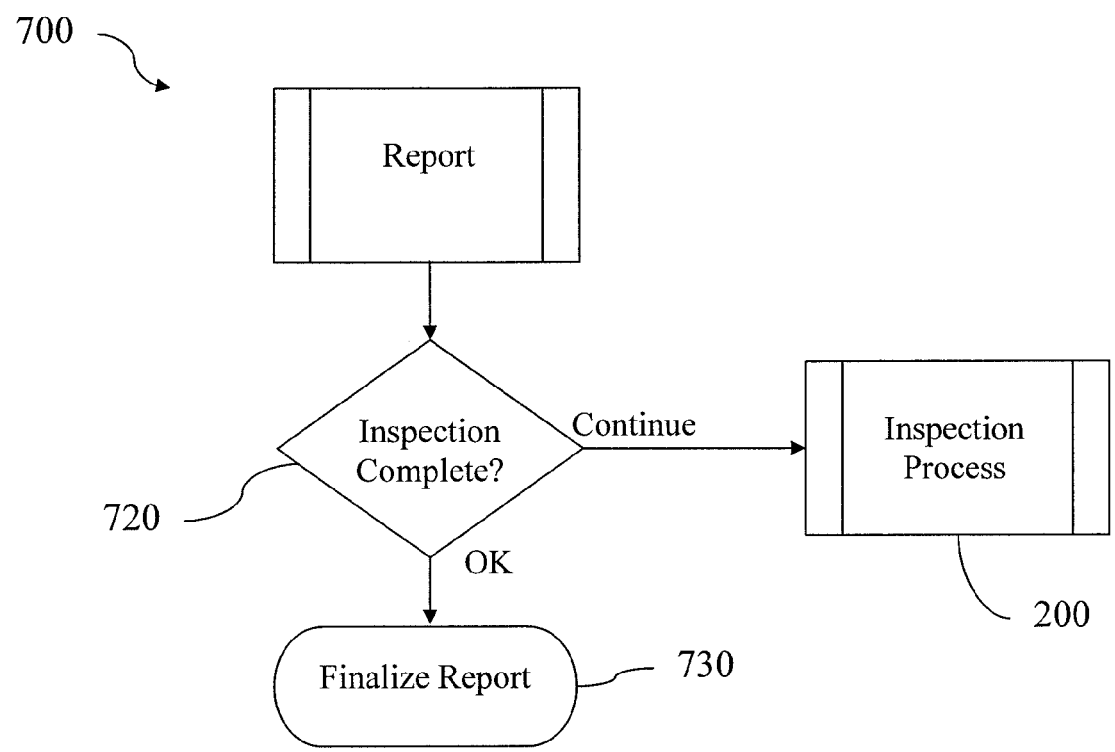
FIG. 7 is a flow diagram of one embodiment of a reporting module from FIG. 2.

Reporting module 700 can follow the fuzzy logic analysis in operation 650. Reporting module 700 can also follow other operations which end inspection such as rejected components in module 400. In this embodiment, a reporting module 700 is shown with further detail from one embodiment in FIG. 7. Reporting module 700 can include conditional 710 which reviews whether the inspection is complete. In this exemplary embodiment, an incomplete inspection returns to inspection process 200 to conduct the further inspections. A particular example of an inspection can include variations such as multiple planar surfaces or a single surface divided into several inspection tasks.

Once conditional 720 determines the inspection is complete, operation 730 can produce a report. The report from operation 730 can be in tabular or graphical form intended to communicate the location and degree of deviation for the indicated features. In the embodiment shown in FIG. 7, module 700 can provide a report regarding the features from conditional 430 and the results of the fuzzy logic analysis in operation 650. In further embodiments, reporting module 700 can include identifying the surface features indicated by the imaging process, allowing the automatic detection of features on the surface of the part, and applying an accept/reject criteria which utilizes the results from fuzzy logic algorithm 650. The features can be cracks, pores, damage, missing material and combinations thereof.

In one embodiment, a deposit of component images module 800 is accessed during multiple operations such as those found in conditional 320, operation 530, operation 540 and operation 630. Surface indication detection databases can be populated with data sets from components with known characteristics including conforming surfaces, non-conforming surfaces, defects, imperfections and the like. Data sets can also be generated through theoretical data from design applications including for example CAD and simulation software.

Figure 8:
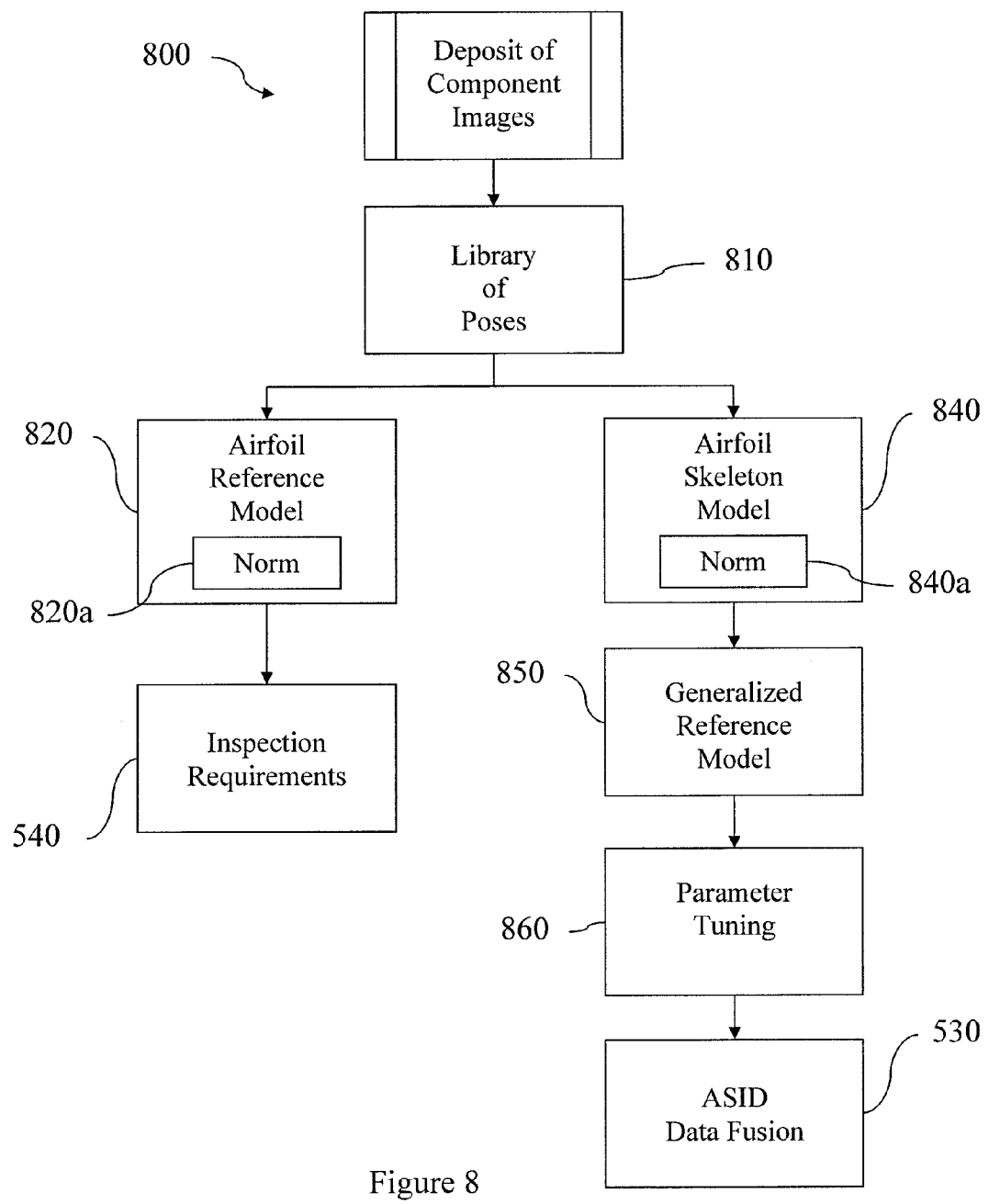
FIG. 8 is a flow diagram of one embodiment of an airfoil library module from FIG. 5.

In the embodiment shown in FIG. 8, deposit of component images module 800 can include a set of component poses 810 for reference. For example, a negative skeleton model 840 of a part under inspection is produced with edge strengthened formation and then the sensed image is compared with a norm reference 840a. Norm reference 840a is analyzed with generalized reference model features in operation 850. A context-based adaptive surface irregularity detection parameter tuning can be applied in operation 860. Parameter tuning 860 can include ensuring selected features are properly detected with applied enhancements and related detection system.

The skeleton model from operation 840 can be further analyzed with ASID techniques such as but not limited to zero-crossing, constant false alarm rates (CFAR), salient-points, neural networks and the like to provide ASID data fusion in operation 530 for irregularity detection in module 500. Deposit of component images module 800 can also utilize a positive reference model 820. Positive reference model 820 can compare an image with a reference norm 820a representative of a positive reference model revealing desirable surface conditions. Norm 820a can be applied to inspection requirements in operation 540 of inspection module 500. In a further embodiment, deposit module 800 could be capable of retaining images produced during inspection process 200 and categorizing the images with information determined according to the image analysis. New images could be stored in a knowledge bank. Deposit module 800 could thereby learn from the inspection process.

In one embodiment of the present application, a method with this system includes applying a surface imaging process to a component, applying an algorithm to efficiently manipulate the component with robotic positioning and applying fuzzy logic analysis to identify surface features of the component shown by the surface imaging process.

One aspect of the present application is a method including acquiring a surface image from a surface of a component; providing an image registration for the surface image; inspecting the component in response to the image registration to produce an input data set; creating an output data set in response to the input data set utilizing a fuzzy logic algorithm; and identifying a surface feature in response to the surface image and the output data set. Features of this aspect can include acquiring the surface image by generating a radiation media; directing the radiation media at the component; detecting a responding radiation media in response to the directed radiation media and the component; creating the surface image in response to detecting the responding radiation media; and adjusting the radiation media in response to the surface image and a standard image.

Another feature of this aspect can be where providing the image registration further includes accessing a deposit of component images where the deposit of component images is retrievable by a set of generalized features; assessing the surface image based on the set of generalized features; and determining a failure response to a non-conformity indicated by assessing the surface image. Yet other features of this aspect can be where inspecting the component further includes operating a part manipulator structured to position the component in response to the image registration and a positioning algorithm; providing a radiation media configuration in response to the image registration and a positioning algorithm; and retrieving a set of inspection requirements from a deposit of component images. Still further features can include creating the output data set by conducting a fuzzy logic analysis and a learning process utilizing a surface component library; and generating a surface feature report.

Another aspect of the present application is a method including acquiring a surface image from a surface of a component utilizing an image acquisition process; determining a degree of conformity in response to a set of generalized features; determining a compliance status in response to the degree of conformity; providing an image registration for the surface image in response to the compliance status; inspecting the surface of the component utilizing a positioning system to produce an input data set; creating an output data set in response to the input data set utilizing a fuzzy logic algorithm; and identifying a surface feature in response to the surface image and the output data set.

Features of this aspect can be where the image acquisition process further includes generating a radiation media; directing the radiation media at the component utilizing uniform diffused light; detecting a responding radiation media in response to the directed radiation media and the component; creating the surface image in response to detecting the responding radiation media; and adjusting generating the radiation media in response to the surface image and a standard image. Another feature of this aspect can be where the positioning system further includes a surface positioner structured to position the component in response to the image registration and a positioning algorithm.

Yet another aspect of the present application is an apparatus including a positioning system having a component manipulator structured to position a component in response to a positioning algorithm; an image acquiring system structured to generate a component image including a radiation media director and a radiation media detector; an image data processing system utilizing a fuzzy logic algorithm capable of: applying the component image as a set of input variables; assigning a degree of conformity to the set of input variables; determining an analysis data set in response to the set of input variables and the degree of intensity; and converting the analysis data set to a set of solutions; and a microprocessor structured to provide at least one surface feature in response to the set of solutions and a cognitive characterization process utilizing a deposit of component images. A feature of this aspect can be where providing at least one surface feature further includes characterization of at least one surface anomaly.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method comprising:
   acquiring a surface image from a surface of a component;
   providing an image registration for the surface image to determine the component type;
   inspecting the component in response to the image registration to produce an input data set;
   creating an output data set in response to the input data set utilizing a fuzzy logic algorithm; and
   identifying a surface feature in response to the surface image and the output data set;
   wherein the method is performed using a computer or processor;
   wherein inspecting the component further includes operating a part manipulator structured to position the component in response to the image registration and a positioning algorithm;
   wherein the positioning algorithm is determined based on the image registration.

2. The method of claim 1, wherein acquiring the surface image further includes
   generating a radiation media;
   directing the radiation media at the component;
   detecting a responding radiation media in response to the directed radiation media and the component; and
   creating the surface image in response to detecting the responding radiation media.

3. The method of claim 2, wherein acquiring the surface image further includes adjusting the radiation media in response to the surface image and a standard image.

4. The method of claim 1, wherein providing the image registration further includes accessing a deposit of component images wherein the deposit of component images is retrievable by a set of generalized features.

5. The method of claim 4, wherein providing the image registration further includes determining a failure response to a non-conformity indicated by assessing the surface image.

6. The method of claim 1, wherein inspecting the component further includes providing a radiation media configuration of the component to a detection device in response to the image registration and a positioning algorithm.

7. The method of claim 1, wherein inspecting the component further includes retrieving a set of inspection requirements from a deposit of component images.

8. The method of claim 1, wherein creating the output data set further includes conducting a fuzzy logic analysis and a learning process utilizing a surface component library.

9. The method of claim 1, further including generating a surface feature report.

10. The method of claim 1, wherein utilizing the fuzzy logic algorithm includes:
    applying the surface image as a set of input variables;
    assigning a degree of conformity to the set of input variables;
    determining an analysis data set in response to the set of input variables and the degree of conformity; and
    converting the analysis data set to a set of solutions; and
    further comprising utilizing a microprocessor to provide at least one surface indication in response to the set of solutions and a cognitive characterization process utilizing a deposit of component images.

11. A method comprising:
    acquiring a surface image from a surface of a component utilizing an image acquisition process;
    determining a degree of conformity in response to a set of generalized features;
    determining a compliance status in response to the degree of conformity;
    providing an image registration for the surface image in response to the compliance status to determine the component type;
    inspecting the surface of the component utilizing a positioning system selected in response to the image registration to produce an input data set;
    creating an output data set in response to the input data set utilizing a fuzzy logic algorithm; and
    identifying a surface feature in response to the surface image and the output data set;

wherein the positioning system further includes a surface positioner structured to position the component in response to the image registration and a positioning algorithm;

wherein the positioning algorithm is determined based on the image registration.

12. The method of claim 11, wherein the image acquisition process further includes generating a radiation media;

directing the radiation media at the component utilizing uniform diffused light;

detecting a responding radiation media in response to the directed radiation media and the component; and creating the surface image in response to detecting the responding radiation media.

13. The method of claim 12, wherein the image acquisition process further includes adjusting generating the radiation media in response to the surface image and a standard image.

14. The method of claim 11, wherein utilizing the fuzzy logic algorithm includes:

applying the surface image as a set of input variables;

assigning a degree of conformity to the set of input variables;

determining an analysis data set in response to the set of input variables and the degree of conformity; and converting the analysis data set to a set of solutions; and further comprising utilizing a microprocessor to provide at least one surface indication in response to the set of solutions and a cognitive characterization process utilizing a deposit of component images.

15. An apparatus comprising:

a positioning system including a component manipulator structured to position a component in response to a positioning algorithm;

an image acquiring system structured to generate a component image including a radiation media director and a radiation media detector;

an image data processing system utilizing a fuzzy logic algorithm configured to:

apply the component image as a set of input variables;

assign a degree of conformity to the set of input variables;

determine an analysis data set in response to the set of input variables and the degree of conformity; and convert the analysis data set to a set of solutions; and a microprocessor structured to provide at least one surface indication in response to the set of solutions and a cognitive characterization process utilizing a deposit of component images.

16. The apparatus of claim 15, wherein providing the at least one surface feature further includes characterization of at least one surface anomaly.

* * * * *